United States Patent [19]

Deley et al.

[11] Patent Number: 4,872,724
[45] Date of Patent: Oct. 10, 1989

[54] FIXING DEVICE FOR A COVERING, ESPECIALLY A COVERING OF A SEAT

[75] Inventors: Serge Deley, Seloncourt; Francois Fourrey, Montbeliard, both of France

[73] Assignee: ECIA-Equipements Et Composants Pour L'Industrie Automobile, Audincourt, France

[21] Appl. No.: 269,331

[22] Filed: Nov. 10, 1988

[30] Foreign Application Priority Data

Nov. 24, 1987 [FR] France ................................. 87 16287

[51] Int. Cl.⁴ ............................................. A47C 27/00
[52] U.S. Cl. ........................................ 297/218; 5/403; 24/626; 160/DIG. 15
[58] Field of Search .................... 297/218, 219, 218; 160/327, 382, 391, 392, 403, 404, 398, DIG. 15; 49/492; 5/403, 404; 24/697, 626, 296, 265 C

[56] References Cited

U.S. PATENT DOCUMENTS

| | | | |
|---|---|---|---|
| 2,938,249 | 5/1960 | Milne | 49/492 |
| 3,048,910 | 8/1962 | Sturtevant | 24/626 |
| 3,499,257 | 3/1970 | Heverly et al. | 24/626 |
| 4,789,201 | 12/1988 | Selbert | 297/218 |

FOREIGN PATENT DOCUMENTS 474512  6/1951  Canada ................................. 24/626

Primary Examiner—James T. McCall
Attorney, Agent, or Firm—Sughrue, Mion, Zinn, Macpeak & Seas

[57] ABSTRACT

Fixing device for a covering (9), especially a covering of a seat, comprising on the one hand a profiled section (1) having longitudinal slots (15), and on the other hand an edging wire (17, 17a) bent at at least two places to form fasteners (19, 19a) intended to cooperate with the slots, the fasteners (19, 19a) lying generally in a plane inclined to the axis of the edging wire (17, 17a) and being capable of deforming by twisting during their entry into a slot (15) in the profiled section, but resiliently recovering their initial shape and their inclined position after this insertion.

10 Claims, 3 Drawing Sheets

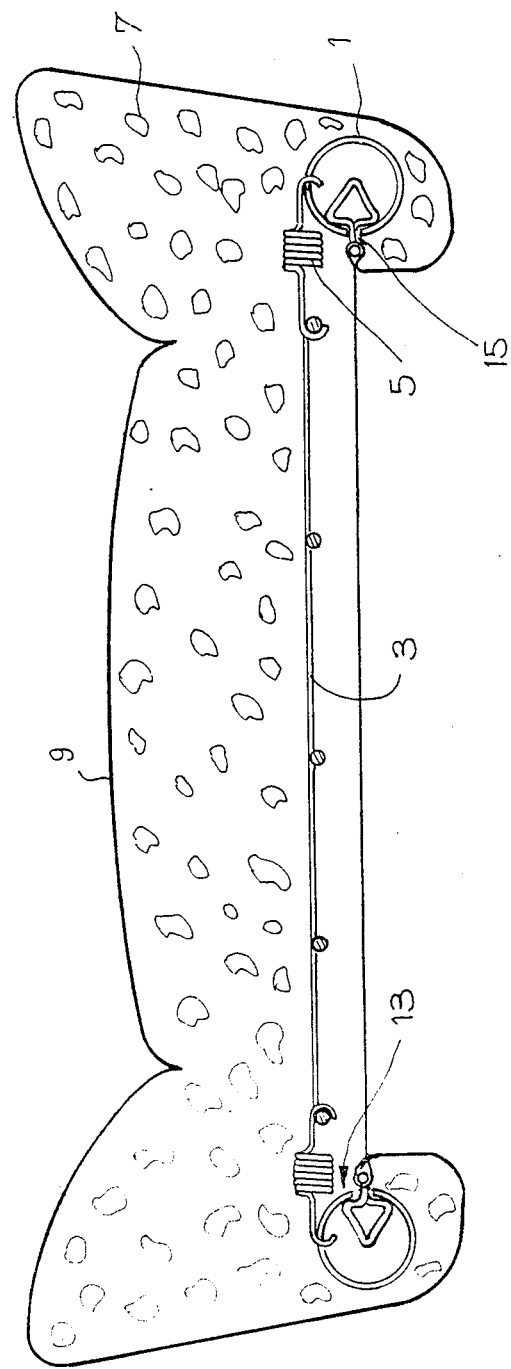

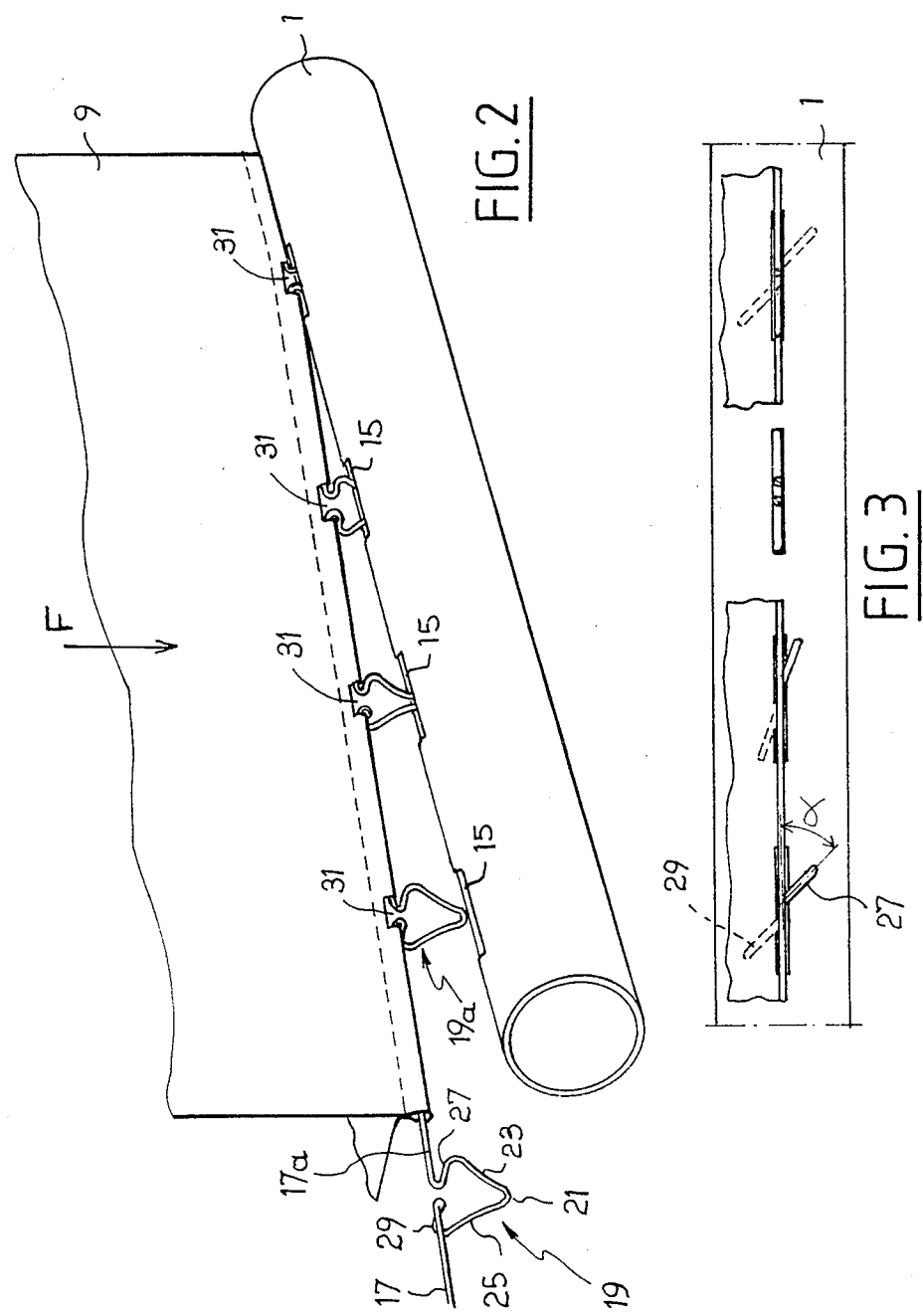

FIXING DEVICE FOR A COVERING, ESPECIALLY A COVERING OF A SEAT

BACKGROUND OF THE INVENTION

The invention relates to a fixing device for a covering, either on seats, and particularly seats for motor vehicles, or on a partition or wall, or the like.

Fixing of a covering generally requires a certain number of preparatory operations on the covering, for example provision of edging, which have to be carried out accurately; moreover fasteners have to be made and placed with accuracy, which involves an increase in manufacturing costs.

SUMMARY OF THE INVENTION

The present invention has as its object to solve the problem of fixing of a covering, by making a device which enables it to be easily and rapidly fixed on any kind of support, without special accuracy.

The invention has as its subject a device for fixing a covering which comprises on the one hand a profiled section having longitudinal slots, and on the other hand an edging wire bent at at least two places to form fasteners intended to cooperate with the slots, each fastener lying generally in a plane inclined to the axis of the edging wire, and being capable of deforming by twisting during its insertion into a slot in the profiled section, but resiliently recovering after this insertion its initial shape and a position inclined to the slot.

According to other features:

the fasteners have substantially the shape of a triangle with a rounded apex, the base of which lies in the said inclined plane and the apex of which lies in a plane parallel to the axis of the edging wire;

the slots in the profiled section extend parallel to the direction of the edging elements;

the base of each fastener, after insertion, bears on the internal face of the section, on each side of the receiving slot.

In the present description, the invention has been described in conjunction with a particular application of a seat covering, but it should be understood that this description is only given by way of example and does not in any way limit the field of application of the invention. The description will be given with reference to the accompanying drawings, given solely by way of example in which:

BRIEF DESCRIPTION OF THE DRAWINGS

FIG. 1 is a view in transverse section of an upholstered seating element;

FIG. 2 shows the different stages of assembly of the fastening means according to the invention;

FIG. 3 is a view along F in FIG. 2;

DETAILED DESCRIPTION OF PREFERRED EMBODIMENTS

FIGS. 1 and 4 show a seating element, seat or back, constituted by a hollow frame or profiled section 1 on which is fixed a base 3, either via springs 5 (FIG. 1), or directly (FIG. 4). Padding 7, preferably of resilient foam, is either laid on the base and carried round the frame, or laid on the base and the frame, without enclosing the latter.

Figure 4B:
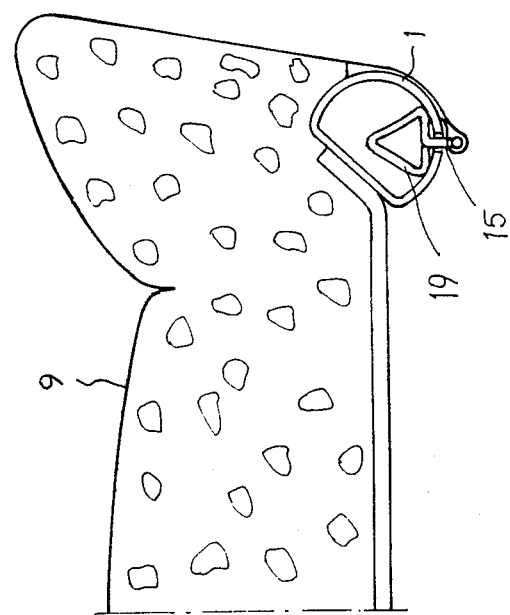
FIGS. 4A and 4B show variations of the seat.
Figure 4A:
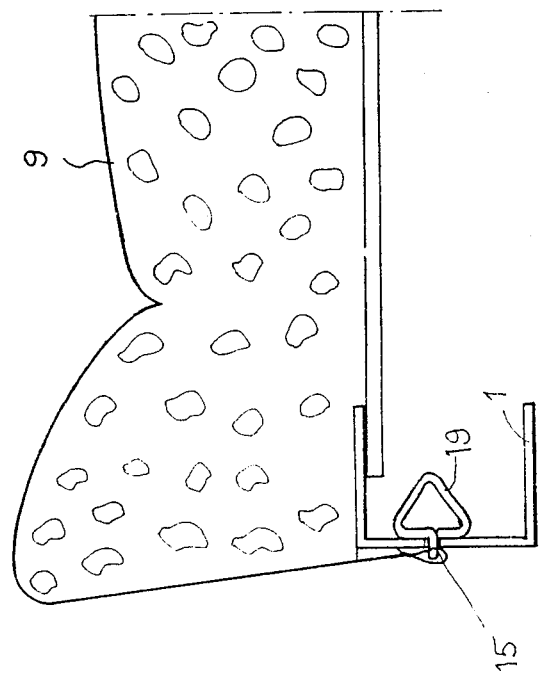

A covering 9, of woven fabric or any other decorative material, encloses the padding, and, in the case of the embodiments shown in FIGS. 4A and 4B, part of the frame 1.

The fixing device for the covering is constituted on the one hand by the profiled section 1 in which there are longitudinal slots 15, coaxial but spaced apart, and on the other hand by an edging wire, with the general reference 13, the axis of which is parallel to that of the slots 15. The wire has a plurality of portions 17, 17a, which are generally but not necessarily straight, serving to provide an edge to the covering 9, and at at least two places it is bent so as to form fasteners 19, 19a enabling the covering 9 to be fastened onto the frame 1. The straight portions 17, 17a lie on one side and the other of a fastener 19.

The fasteners 19, 19a project relatively to the straight portions 17, 17a and in a general way they lie in a plane inclined to the axis of the edging wire.

The fasteners have substantially the shape of a triangle, the rounded apex 21 of which lies in a plane parallel to the axis of the edging wire, so as to assist the engagement of the fastener in the slots 15 of the frame 1. The sides 23, 25 of the triangle forming the fastener widen out in the opposite direction from this plane and are then bent towards one another into two wings 27, 29 to thus form the base of the triangle and constitute a retaining base of the fastener. The wings 27, 29 make an angle of α to the axis of the wire and, after insertion, they bear on each side of the slot 15, thus providing the fastening of the system on the frame 1. The total length of the wings being greater than the width of the slot 15 but less than the length of the slot, the result is ease of assembly due to the fact that it is not necessary for the respective spacings of the slots 15 and of the fasteners 19, 19a etc. to be very accurate.

The upholstering operation proceeds as follows. Firstly the covering 9 is prepared by making openings 31 in it which are of small size as compared with the length of the wings 27, 29, into which the fasteners 19 are inserted, by squeezing them together laterally, and then the fasteners are allowed to recover resiliently their initial shape. Then the covering is turned over around the straight portions 17, 17a etc and the covering is fixed relatively to the latter by making a longitudinal seam along the latter, which anchors the fixing device to the covering. So that the covering will have practically its final dimensions, it is necessary that at least two of its edges are provided with an edging wire.

Moreover, the base 3 has been assembled on the frame 1, and this base and the frame have been covered with the padding 7. Then the prepared covering 9 is laid on this assembly, which is a particularly easy operation because the covering is not fixed at any point, making sure that the fasteners 19, 19a are roughly facing the slots 15. The necessary seams are made for shaping the padding, then the fasteners 19, 19a are inserted into the slots 15 of the frame 1 so as to fix and tighten the covering.

The operation of inserting the fasteners 19, 19a etc. breaks down in the following way (FIGS. 2 and 3). First the tip 21 of each of the fasteners 19 is engaged in the corresponding slot 15. In step with the entry of the fastener into the slot, the sides 25, 23 and the wings 27, 29 deform resiliently in a twisting movement, until the moment when the wings are parallel to the slot 15 and can pass through it. When the wings emerge from the slot 15 on the side remote from the assembly, the fastener recovers its original shape and its initial inclined position, and its wings lie on each side of the slot on the inside of the frame. The wings 27 and 29 then bear on the internal face of the frame, with their initial angle α of inclination, thus preventing return of the fastener out of the slot, and thus providing the fixing of the covering 9.

It will be noted that it is not necessary that the members of the frame should have a cylindrical crosssection, any frame member the cross-sectional shape of which enables slots to be made in it may be suitable, as for example a U-shaped profiled section (FIG. 4A) or a section of closed stirrup shape (FIG. 4B).

Likewise the padding and covering can almost completely surround the frame member, in which case the slots 15 lie on the part of the frame directed inwards.

It will be noted that the fixing device of the present invention presents numerous advantages: easy insertion of the edging wire in the covering, inexpensive manufacture because it is not necessary to have great accuracy in the manufacture of the various components, and very easy installation, which may even be carried out by a robot.

What is claimed is:

1. Device for fixing a covering, comprising a profiled section (1), having a series of longitudinal slots (15), and an edging wire (13) bent at at least two places to form fasteners (19, 19a) intended to cooperate with the slots, characterized in that each fastener (19,19a) lies generally in a plane inclined to the axis of the edging wire (13), and is deformable by twisting for the purpose of its insertion into a slot (15) in the profiled section, but resiliently recovers after this insertion its initial shape and a position inclined to the wire and to the slot.

2. Device for fixing a covering according to claim 1, characterized in that the fasteners (19, 19a) have substantially the shape of a triangle with a rounded apex (21), the base (27, 29) of which lies in the inclined plane while the apex (21) lies in a plane parallel to the axis of the edging wire.

3. Fixing device according to claim 2, characterized in that the slots (15) in the profiled section (1) are parallel to the edging wire.

4. Fixing device according to claim 3, characterized in that, after insertion, the base (27, 29) of each fastener (19, 19a) bears on the internal face of the profiled section (1) on both sides of the receiving slot (15).

5. Fixing device according to claim 4, characterized in that the length of the base (27, 29) of the triangle of the fastener is less than the length of the slot.

6. Fixing device according to claim 5, characterized in that the fasteners (19, 19a) lie between straight portions (17, 17a) of the edging wire.

7. Fixing device according to claim 6, characterized in that the covering (9) is wrapped around the straight portions (17, 17a) of the edging wire, and that the fasteners (19, 19a) project through openings (31) in the covering.

8. Seating element comprising a hollow frame (1) on which is fixed a base (3) supporting padding (7) having a covering (9), characterized in that the covering (9) is fixed by a fixing device according to claim 1, the profiled section being constituted by a frame member of the seat.

9. Seating element according to claim 8, characterized in that the padding (7) and the covering (9) almost completely surround the frame member (1), and that the slots (15) lie on the part of the frame member facing towards the interior of the seat.

10. Seating element according to claim 8, characterized in that the covering (9) extends beyond the padding and encloses a part of the profiled section.

* * * * *